United States Patent [19]

Ashley et al.

[11] Patent Number: 4,530,822

[45] Date of Patent: Jul. 23, 1985

[54] GAS/LIQUID CONTACT PROCESSES

[75] Inventors: Michael J. Ashley, Solihull; Roy A. Greaves, Tamworth; all of England

[73] Assignee: Dresser U.K. Ltd., Great Britain

[21] Appl. No.: 615,719

[22] Filed: May 30, 1984

Related U.S. Application Data

[63] Continuation of Ser. No. 306,042, Sep. 28, 1981, abandoned.

[30] Foreign Application Priority Data

Oct. 3, 1980 [GB] United Kingdom ................ 8031942

[51] Int. Cl.³ .................... C01B 17/00; B01D 47/06; B01D 50/00
[52] U.S. Cl. .......................................... 423/242; 55/8; 55/90; 55/126; 55/230; 55/259; 422/169; 159/4 S
[58] Field of Search ................ 55/8, 10, 90, 126, 230, 55/238, 257 R, 259; 261/78 A, 79 A, 88; 422/168, 169; 423/242 A, 244 A; 159/4 S

[56] References Cited

U.S. PATENT DOCUMENTS 4,198,380 4/1980 Kohl .................................... 423/242

FOREIGN PATENT DOCUMENTS 440766 12/1971 Australia .
836897 3/1970 Canada .................................. 183/20
2040271 8/1980 United Kingdom .

OTHER PUBLICATIONS

"Dry FGD and Particulate Control System", K. A. Moore et al., 1979.
"C-E Dry Scrubber Systems: Application to Western Coals", J. R. Martin et al., 1980.
"Dry SO₂ Scrubbing at Antelope Valley Station", R. A. Davis et al., 1979.
"Basin Electric's Involvement with Dry Flue Gas Desulphurisation", K. E. Janssen et al., 1979.
Spray Drying Handbook, Third Edition, by K. Masters, published 1979, pp. 169–177.

Primary Examiner—David L. Lacey
Attorney, Agent, or Firm—Daniel Rubin

[57] ABSTRACT

In a process involving contacting a gas with a liquid whereby to cool and/or clean the gas, the liquid is sprayed into the gas by a rotary-cup atomizer or other "air-assisted" atomizer in which the spray is produced by impacting a film of the liquid with a high pressure air stream. The atomizer has a low spray angle which is beneficial to ensuring good contact with the gas. The method is particularly applicable to processes where the liquid is an abrasive slurry or solution, as in a process of desulphurizing a hot flue gas by spray drying in a tower.

13 Claims, 11 Drawing Figures

GAS/LIQUID CONTACT PROCESSES

This application is a continuation of application Ser. No. 306,042, filed 9/28/81 now abandoned.

This invention relates to gas/liquid contact processes.

Coal-fired plants, for example, produce flue gases containing sulphur dioxide and particulate matter (fly ash) with a consequential gas cleaning requirement which includes removal of the sulphur dioxide.

A first method comprises wet scrubbing with water, solutions or slurries and is subject to operational problems. Since water alone is not particularly effective, suitable solutions or slurries are used and the liquid circulation systems are subject to severe corrosion due to the corrosive nature of the solutions and the slurries. In addition, blockages of the systems are caused by scaling when using lime-based slurries, and there is the problem of disposal of the wet sludge end product.

Another method comprises pre-treatment of the coal itself. While this is technically feasible, it is presently uneconomic and unlikely to remove all of the sulphur from the coal before combustion, so that means to remove sulphur dioxide from the flue gas will still be needed.

A third method comprises fluidized bed combustion in which a sulphur dioxide absorbent material, such as limestone or dolomite, is introduced into the fluidized bed so that the sulphur dioxide is removed as soon as it is formed, thus avoiding the need for scrubbing the flue gases. This method is still under development and unlikely to be practical on a large utility scale for some considerable time.

A fourth method employs dry absorption systems, mostly using forms of activated carbon to absorb the sulphur dioxide into the surface thereof in the dry phase. Such a method usually requires off-line regeneration of the absorbent, thus necessitating a battery of absorbers with switch-over arrangements, and is presently considered economically unviable, at least on a large utility scale.

Recently a fifth method has been the subject of considerable interest. This comprises the use of spray dryer systems, similar to those used for the production of soap, coffee and milk powders, for spraying a sulphur dioxide absorbing solution or slurry into a hot flue gas stream. As the absorbent removes the sulphur dioxide from the gas, the water evaporates from the spray droplets, leaving a dry powder containing the sulphur dioxide, some of which powder readily separates from the gas for immediate collection. Since the flue gas will still contain some particles of the powder it is appropriate to pass the effluent gas from the spray dryer through a bag filter or an electroprecipitator prior to release to the atmosphere.

Spray dryer desulphurization offers various advantages over conventional systems. These include: the only effluent is a powder which is more readily and cheaply disposed of than sludges or solutions; the gas leaves the spray dryer unsaturated, thus avoiding potential corrosion problems and the need to reheat the gas to prevent a permanent steam plume from the stack; expensive liquid recirculation systems are avoided at the absorption locality, together with the associated scaling and corrosion problems; less water is required; energy consumption is generally 25 to 50% of that required for wet scrubbing.

A known spray dryer technique (see for example U.K. Published Patent Application No. 2014975A (Rockwell), and U.K. Published Patent Application No. 2021086A (Niro)) employs spinning-disc or spinning wheel atomizers, also referred to as centrifugal disc atomizers, instead of spray nozzles for spraying a sulphur dioxide absorbing solution into a hot flue gas stream. These atomizers consist of a disc or a wheel-like impeller rotating in a horizontal plane. Liquid fed to the rotating wheel or disc is flung off at high velocity at the periphery.

The absorbent used to remove sulphur dioxide may for example be sodium carbonate or lime. While sodium carbonate is the more efficient reagent of the two, it is generally less available and more expensive than lime. However, lime introduces operational and design problems. More particularly, lime is only slightly soluble in water and must be used as a slurry which is abrasive and can lead to abrasion in pumps and nozzles; also the mixing of quicklime with water to form slaked lime requires carefully controlled conditions in order to optimize the reactivity of the lime.

Whereas lime slurries themselves appear to cause little wear of the spray nozzles or atomizers of the types presently used, particulate impurities in the slurry have been found to cause rapid wear of nozzles of centrifugal disc atomizers. Commercial lime as received often contains insoluble particulate impurities, and also when a slurry recycling system is employed the lime slurry will in fact normally include a proportion of fly ash, unless the fly ash has been removed from the flue gas prior to spray drying, and such a fly ash/lime slurry can cause particularly rapid wear of nozzles of atomizers of the types presently used. In addition, slurry build up on nozzles can cause disturbance in the spray patterns. Particulate impurities can also cause nozzle wear when present in sodium carbonate absorption solutions.

It is thus one object of the present invention to provide an alternative method of contacting the hot dirty flue gas with the absorbent which will not involve erosion of the spray producing means.

The method proposed by the present invention was found to be applicable with advantage to processes other than desulphurizing flue gases, and therefore the invention is not so restricted.

The invention provides a method of treating a polluted gas with a liquid, wherein the liquid is directed from an extended surface of a spray device into the polluted gas to cool and/or clean the gas: comprising the steps of (a) continuously providing a film of the liquid on said surface preparatory to directing the liquid from the surface into the gas; and (b) impacting the liquid when it has left the surface with a gaseous stream thereby to produce a spray of liquid droplets for contacting with the polluted gas.

The invention also provides a method of treating a polluted gas with a liquid, wherein the liquid is directed into the polluted gas from an extended surface provided on the interior of a rotating cup of a spray device to cool and/or clean the gas: comprising the steps of (a) continuously providing a film of the liquid on said surface preparatory to directing the liquid from the surface into the gas; (b) providing a gaseous stream around the cup where the liquid leaves said surface; and (c) impacting the liquid with the gaseous stream thereby to produce a spray of liquid droplets for contacting with the polluted gas.

The cup is rotated at a speed of for example up to 5,000 revolutions per minute.

The invention also provides an apparatus adapted for use in desulphurizing a hot sulphur dioxide-containing gas comprising (a) a gas/liquid contacting vessel which comprises an inlet and an outlet for the gas; (b) means for supplying to the vessel an aqueous solution or slurry which absorbs sulphur dioxide with chemical reaction; (c) means communicating with the vessel outlet for removing suspended particles from the gas which has been contacted with solution or slurry in the vessel; and (d) means for controlling the conditions in the gas in the vessel such that in operation the reaction product is dried as it is formed and all the water is evaporated; the means for supplying the aqueous solution or slurry comprising a spray device adapted to direct the solution or slurry from an extended surface of the device into the gas in the vessel, which spray device comprises (i) a cup which is rotatable about its axis and the interior of which provides the extended surface; (ii) means for supplying the solution or slurry to the interior surface of the cup so that a film of liquid is continuously provided on said surface preparatory to directing the liquid from the surface into the gas; and (iii) means for supplying an air stream to impact the liquid when it has left the surface thereby to produce a spray of liquid droplets for contacting with the gas in the vessel.

The invention also provides an upright evaporative cooling tower comprising an inlet and an outlet for a gas to be cooled, and means for supplying water to the tower for contacting with the gas in the tower to cool the gas; the supply means comprising a spray device adapted to direct the water from an extended surface of the device into the gas in the tower, which spray device comprises (i) a cup which is rotatable about its axis and the interior of which provides the extended surface; (ii) means for supplying the water to the interior surface of the cup so that a film of water is continuously provided on said surface preparatory to directing the water from the surface into the gas; and (iii) means for supplying an air stream to impact the liquid when it has left the surface thereby to produce a spray of water droplets for contacting with the gas to be cooled; the gas inlet being tangential to a continous circular duct which extends around the axis of the spray device, and means being provided to direct the gas from the circular duct to flow past the spray device.

The above and other objects of the present invention will become more clear from the following description, to be read with reference to the accompanying drawings of embodiments of the invention. This description, which is illustrative of method and apparatus aspects of the invention, is given by way of example only, and not by way of limitation of the invention.

In the accompanying drawings:

FIGS. 1a and b illustrate, respectively, the spray pattern produced by a centrifugal disc atomizer and the gas flow pattern around such an atomizer;

FIGS. 2a and b illustrate, respectively, the spray pattern produced by "air-assisted" atomizers and the gas flow pattern around such atomizers;

Figure 1A:
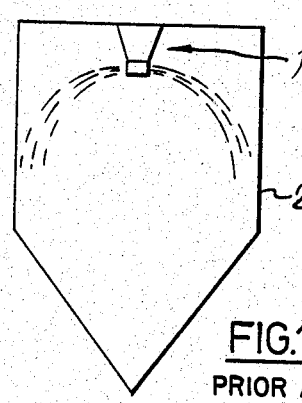
Figure 1B:
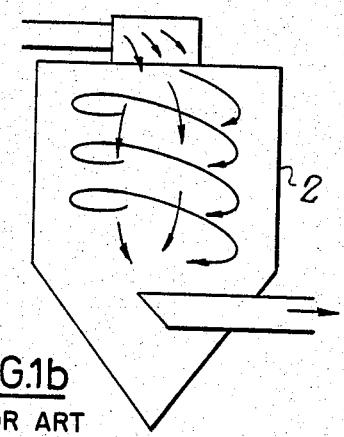

In FIG. 1a there is illustrated the spray pattern of centrifugal disc atomizer 1. Since the liquid is thrown off centrifugally the spray trajectory is flat and requires a large diameter vessel 2. By virtue of the flat spray pattern, "dead" spots are obtained above and immediately below the atomizer, and these result in uneven gas flow (FIG. 1b) through the vessel 2, as indicated by the arrows, with a consequent effect of uneven contact between the gas and the liquid being sprayed.

Figure 2A:
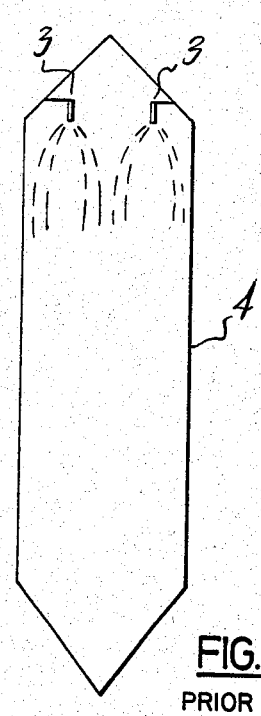
Figure 2B:
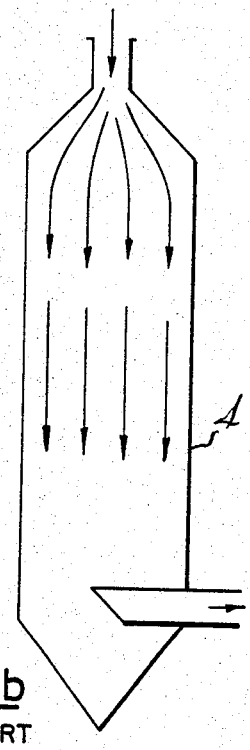

In order to optimize the gas/liquid contact it is preferable to use a tall thin tower in which the gas flow distribution is optimized. Such a tower is, however, incompatible with centrifugal disc atomizers. We have found that "air-assisted" atomizers, in particular rotary-cup atomizers as used in oil burning installations, can be used to produce a spray pattern with a low angle (as opposed to the 180° angle of centrifugal disc atomizers) which is particularly suitable for use with tall thin towers. FIG. 2a illustrates the spray pattern produced by two such "air-assisted" atomizers 3, and FIG. 2b the gas flow pattern around such "air-assisted" atomizers in a tall thin tower 4. Typically a tall thin tower has an internal height at least twice (preferably at least three times) its internal diameter; e.g. 20 ft. (6 meters) in height and 6 ft. (1.8 meters) in diameter would be typical; whereas a centrifugal-disc atomizer is used with towers some 18 ft. (5.5 meters) high and 14 ft. (4.3 meters) in diameter, or measurements in similar proportions.

Figure 3:
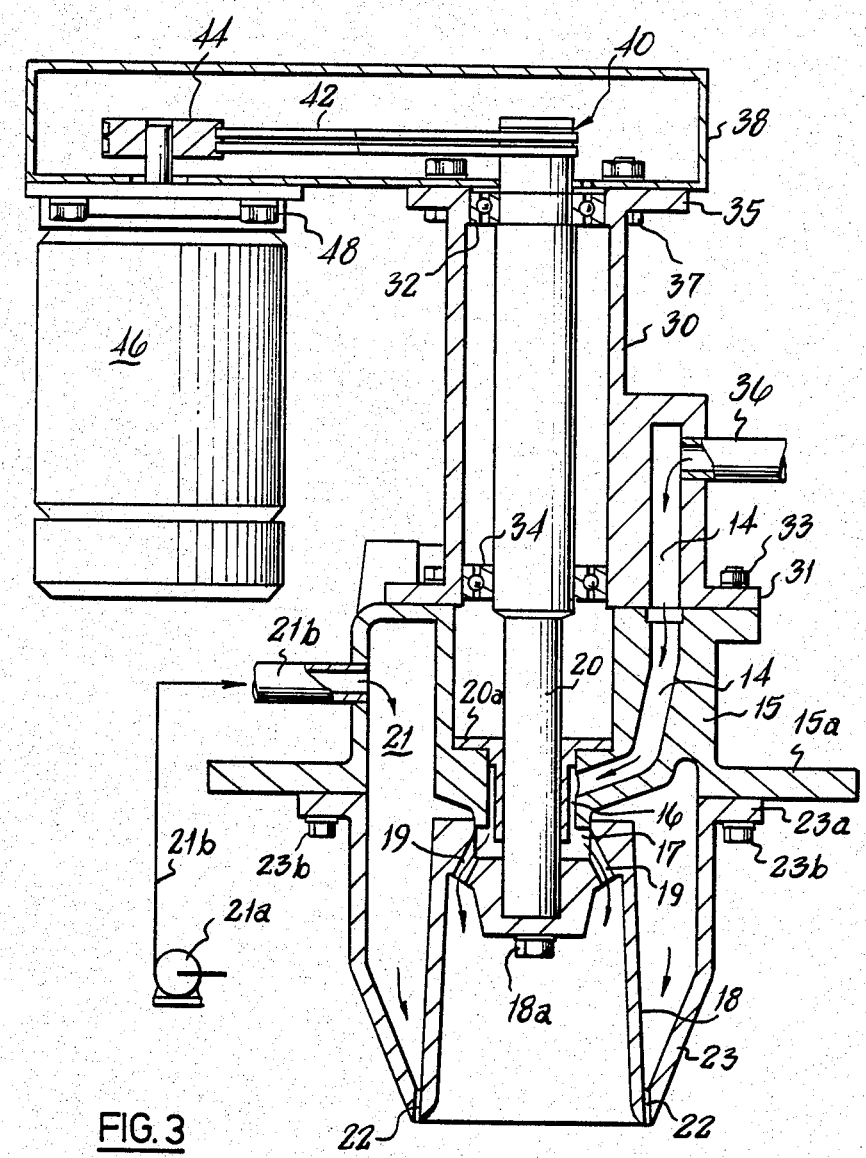
FIG. 3 shows a section through a rotary-cup atomizer.

In the rotary-cup atomizer shown in FIG. 3 a liquid supply path comprises a duct 14 a lower portion of which is defined in a housing element 15, a duct 16, a chamber 17 at the top of an inverted frustoconical rotary cup 18, and a plurality of ducts 19. The cup 18 is secured by a retaining screw 18a to a shaft 20 for coaxial rotation about a vertical axis with the shaft 20. Air, for example, is supplied through a chamber 21 external to the cup 18 by, for example, a blower 21a (shown diagrammatically in FIG. 3) connected to the chamber 21 via a line 21b. The air exits the chamber 21 via an annular nozzle aperture 22 defined around the lower rim of the rotary cup 18 and between the cup 18 and a stationary cup shroud 23 which also serves to define an outer wall of the chamber 21. A rotary cup atomizer closely resembling the one shown in FIG. 3 is produced by Hamworthy Engineering Limited of England.

The shroud 23 is bolted at 23b to the housing element 15 via respective flanges 23a, 15a. The shaft 20 is mounted in a journal bearing 20a in the housing element 15 and extends upwardly into a housing element 30 where it is mounted in axially spaced ball bearings 32,34. The housing element 30 is bolted at 33 to the housing element 15 via a flange 31. An upper portion of the duct 14 is defined in the housing element 30 and a vessel 7 (FIG. 4) is connected to the duct 14 by a line 36 via a pump 8.

An upper end portion of the shaft 20 extends into a belt housing 38 which is bolted at 37 to the housing element 30 via a flange 35. A belt pulley 40 is mounted on the shaft 20 within the housing 38 and a drive belt 42 is tensioned within the housing 38 around the pulley 40 and a drive pulley 44 of an electric motor 46. The electric motor 46 is bolted to the housing 38 at 48.

In operation the cup is rotated by the electric motor at a speed of e.g. about 5,000 r.p.m., and liquid is continuously supplied to the interior of the rotating cup 18 via the supply path including the ducts 19 and is distributed around the internal surface of the cup as a thin film. As centrifugal force drives the liquid off the lower end portion of the cup it is atomizer by impaction with the high velocity stream of air exiting through aperture 22. This causes instability in the liquid film and results in the production of a spray of fine droplets, which interacts with a gas contacting the spray whereby to clean and/or cool the gas.

Figure 5:
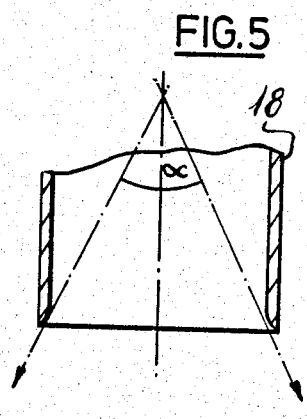
FIG. 5 illustrates a spray pattern angle.

The conical angle α (FIG. 5) of the spray pattern produced by the cup 18 is for example from 25° to 90° (FIG. 5) immediately as the spray leaves the lower rim of the cup 18; preferably the angle α is from 30° to 90° e.g. about 60°. Typically the corresponding conical angle of the cup is about 10° and the angle of the spray pattern is primarily controlled by the volumetric flow rate and linear velocity of the air exiting through the annular nozzle aperture 22. The angle of the spray pattern is reduced by increasing the air rate and increased by reducing the air rate. The flow rate of liquid to the cup 18 is adjusted to obtain a uniform film on its interior; and it is a characteristic of the rotary cup atomizer that it can accommodate a wide range of liquid flow rates without losing its hydrodynamic stability e.g. stability can be maintained while the liquid flow rate varies by a factor of 5 times or more.

One advantage of a rotating cup atomizer for example is that the main atomization process apparently takes place by impaction of the air on the liquid when it has left the interior surface of the cup. Only the cup internal surface is exposed to flowing liquid, and then only at relatively low velocities, so that when using abrasive, especially fly ash/lime, slurries as the liquid there will be little or no abrasion damage to the atomizer as opposed to the considerable abrasion damage that can occur when centrifugal disc type atomizers are used.

While the use of "air-assisted" atomizer, in which a liquid film is impacted with a gaseous stream at a position external to the means producing the liquid film, is particularly beneficial with abrasive liquids in view of the reduced wear aspect, it is also more generally beneficial in that it permits tall towers with optimum gas flow distribution to be used. We have also found that the running of rotary-cup atomisers in comparison with centrifugal-disc atomizers requires the use of considerably less electrical power for equivalent sulphur dioxide removal. Power savings of up to 50% appear possible. Tests have shown that with lime slurries the rotary-cup atomizer arrangement can cope satisfactorily with slurry concentrations of up to 35% solids by weight, and fly ash/lime ratios of up to 3:1 by weight.

Figure 4:
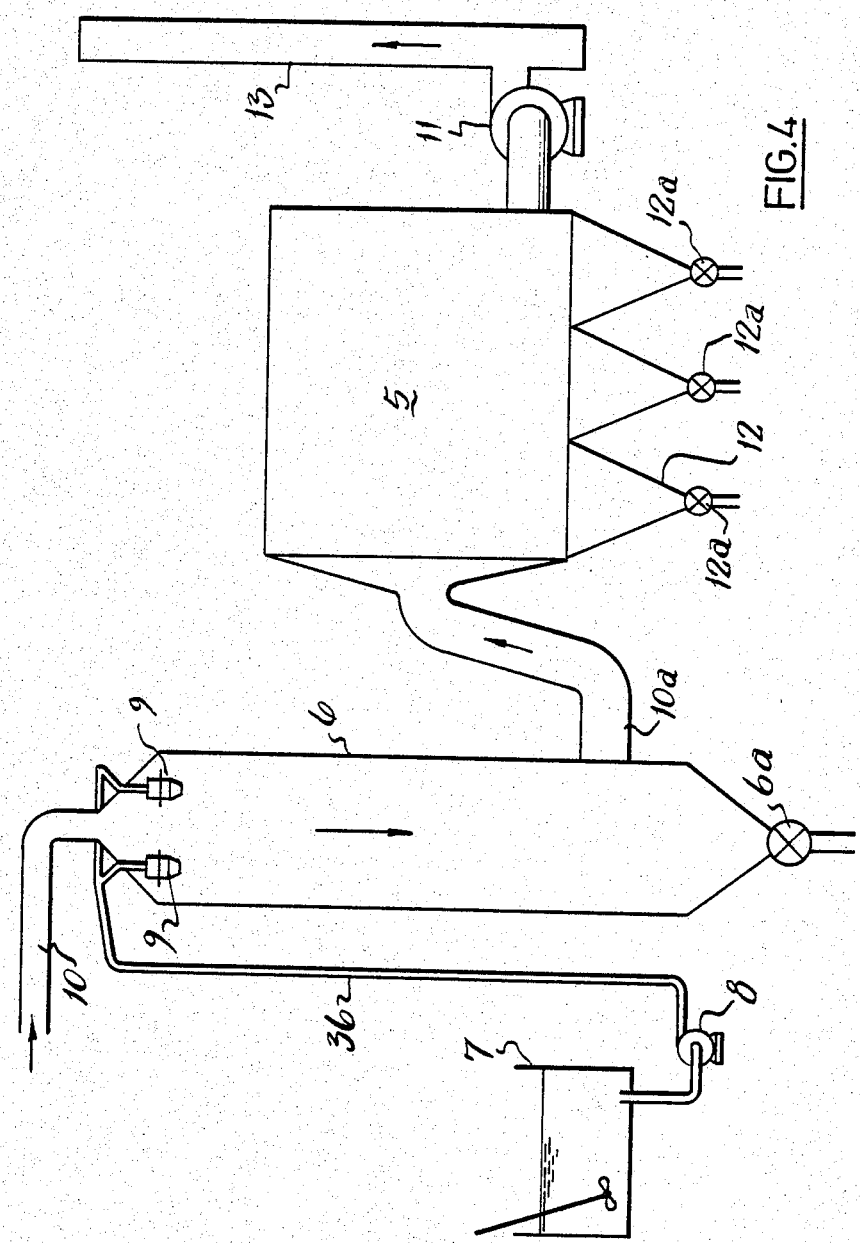
FIG. 4 shows, schematically, a practical arrangement for desulphurizing flue gas.

A practical arrangement for desulphurizing flue gas from a coal-fired installation is illustrated schematically in FIG. 4. The apparatus shown at 5 for treating the flue gas after a desulphurizing tower 6, may comprise a bag filter or an electro-precipitator. Absorbent solutions such as sodium carbonate, or other alkali solutions, or slurries for example, of lime or limestone are prepared in the vessel 7 and pumped by the pump 8 via the line 36 to a plurality of rotary-cup atomizers 9 at the top of tower 6. The atomizers are as shown in FIG. 3 but for clarity the air supply to the atomizers has not been indicated in FIG. 4. Hot gas, for example boiler flue gas at a temperature between 120° C. and 200° C. containing sulphur dioxide (e.g. 300–3,000 p.p.m. $SO_2$ by volume) is directed to the top of the tower 6 via line 10. Spray drying occurs in the tower 6 as described above upon contact of the hot gas and the atomized absorbent, and dry powder effluent is collected at the bottom of tower 6 and removed via a valve 6a. The flue gas then passes via line 10a through bag filter or electro-precipitator 5 and further powder effluent and fly ash (including some spent absorbent) is collected in hoppers 12 and removed via valves 12a. The substantially desulphurized flue gas is then exited to the atmosphere via a stack 13 which is proceeded by a fan 11.

It has been found that with an initial flue gas containing 300–3,000 parts per million and an inlet gas temperature of 160° C. an efficiency of removal of $SO_2$ approaching 90% can be achieved using an arrangement as described with reference to FIGS. 3 and 4 by the combined effect of the tower 6 and a bag filter at 5. With a stoichiometric ratio of absorbent to $SO_2$ of 1.0, the efficiency of $SO_2$ removal was about 80% where the absorbent was sodium carbonate and about 70% where the absorbent was calcium hydroxide. A removal of 70% is ample in most circumstances. At a stoichiometric ratio of 1.5, the efficiency increased to the order of 85% for both sodium carbonate and calcium hydroxide.

A preferred stoichiometric range is 0.5 to 2.0 more preferably 1.0 to 1.5.

It is preferred that the gas exiting the tower 6 at 10a be as close to its dewpoint consistent with maintaining unsaturation at the stack 13; for example 5° to 15° C. above the dewpoint at 10a. It is believed that this enhances the efficiency of absorption in the tower 6 and also of the bag filter if used at 5.

Typically a single tower 6 handles up to 500,000 cubic feet (ambient conditions) per minute of flue gas (14,000 cubic meters per minute), and a 500 Megawatt coal burning power station would require 4 or 5 such towers to handle its entire flue gas effluent.

Figure 6:
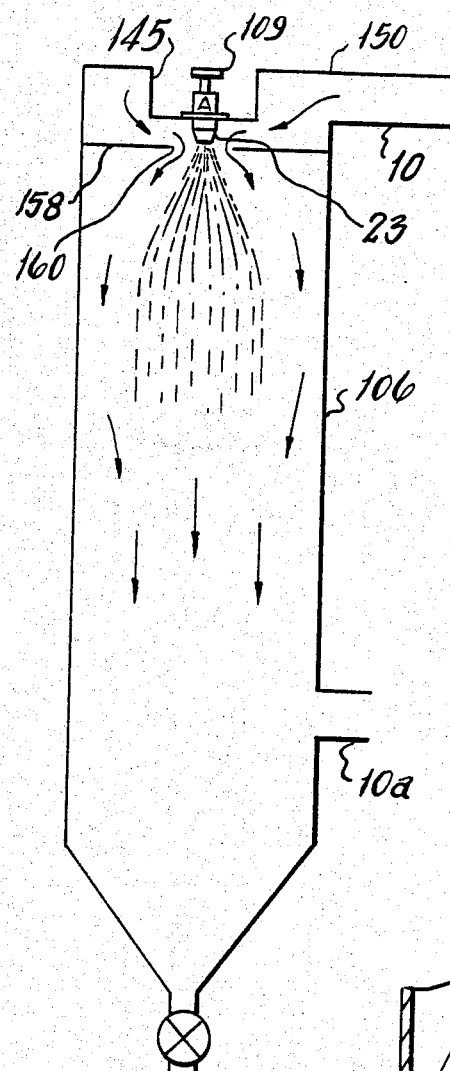
FIG. 6 shows, schematically, a modified form of desulphurization spray tower.
Figure 7:
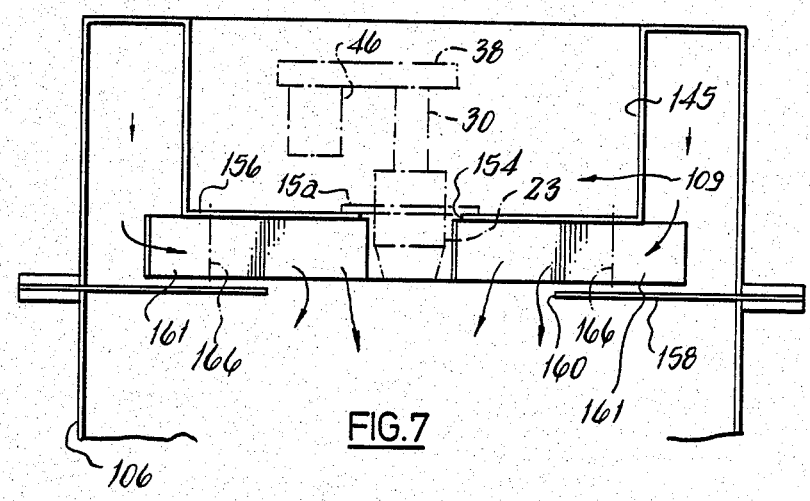
FIG. 7 is an enlarged side view showing gas inlet arrangements of the tower of FIG. 6.
Figure 8:
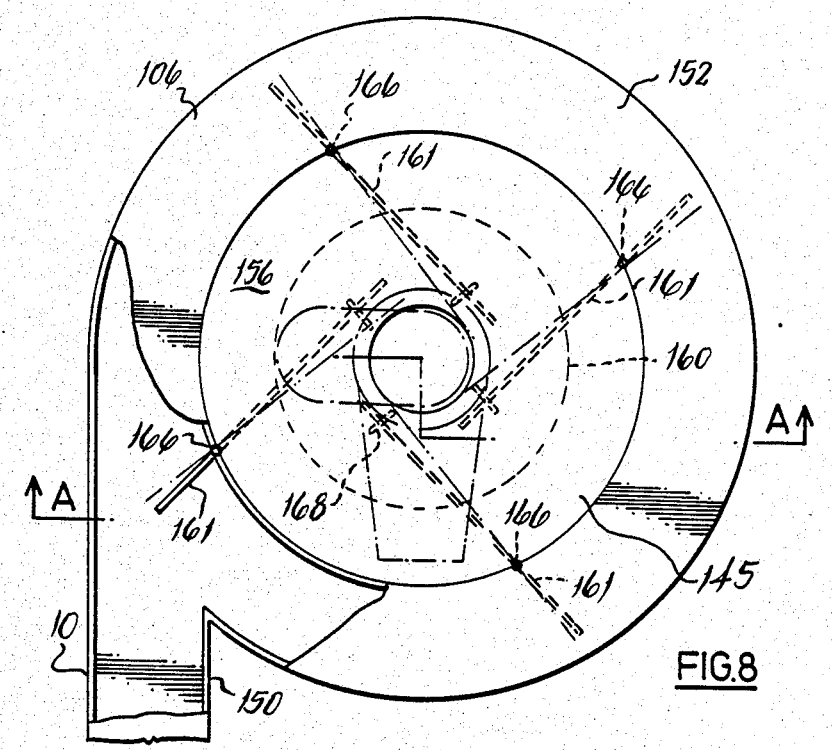
FIG. 8 is a plan view corresponding to FIG. 7.

FIGS. 6, 7 and 8 show at 106 a preferred modified form of the tower 6 designed with a view to optimizing uniform gas flow distribution in the tower and minimizing the risk of the spray pattern impinging on the wall of the tower, which can lead for example to uncontrolled solids build-up and incomplete evaporation.

In the case of the tower 106 a single rotary cup atomizer 109 (which is again as shown in FIG. 3) is located adjacent the top of the tower 106 axially of the tower; and the line 10 leads to an upper inlet 150 of the tower 106 which is tangential of the tower. The inlet 150 leads tangentially into a circular duct 152 (FIG. 8) which extends continuously circumferentially from the inlet 150 round the tower 106 and returns to its junction with the inlet 150. The atomizer 109 is mounted in a circular well 145 the side wall of which is defined by the annular duct 152. The shroud 23 and cup 18 (FIG. 3) of the atomizer extend through an axial orifice 154 in a base wall 156 of the well 145 so that the cup 18 communicates with the interior of the tower 106; the flange 15a is mounted on the base wall 156 around the orifice 154. An orifice plate 158 is mounted in the tower 106 below and spaced from the shroud 23 and defines a central circular orifice 160.

Four adjustable deflector vanes 161 each lying in a vertical plane are mounted in the space between the base wall 156 and the orifice plate 158, and each deflector vane 161 depthwise extends downwardly from the base wall 156 to a locality spaced from the orifice plate 158 and co-planar with the bottom of the shroud 23. Lengthwise each vane 161 extends from closely adjacent the shroud 23 past the rim of the orifice 154 to a position spaced from the inside periphery of the tower 106. Each vane 161 is adjustable about a vertical pivot 166 which extends downwardly from the base wall 156; the vane 161 is adjustable between the limiting positions indicated in FIG. 8 which are defined by the ends of a slot 168; in an inner limiting position of the vane 161 the vane abuts the shroud 23 tangentially thereof.

In operation each vane 161 directs a proportion of the gas flowing along the duct 152 inwardly towards the axis of the tower 106 and the gas then passes past the atomizer 109 through the ofifice 160 into the interior of the tower 106 as indicated by the arrows in the drawings.

While the embodiments of the invention have been described particularly with reference to spray desulphurization, we have found the use of rotary-cup atomizers or other low angle spray "air-assisted" atomizers to be particularly beneficial in connection with gas/liquid contact processes in general. In order to obtain optimum efficiency in such processes, it is necessary to arrange for the maximum possible contact between the gas and the liquid, and it appears that this can be achieved with the good spray pattern produced by rotary-cup atomizers and other low-angle "air-assisted" atomisers in conjunction with towers in which the gas flow distribution is optimized. Advantageously the atomization takes place at a position after a good gas distribution has been achieved, so that in a spray desulphurizer the atomizer or atomizers are arranged towards the top, but not at the top, of the tower. However, under certain circumstances the atomizers may be virtually in the inlet duct 10 (FIG. 4) to the tower 6 before it expands into the tower, or alternatively the atomizers may be at the upper part of the widest portion of the tower proper. In a modification the atomizer or atomizers are located at the bottom of the tower and the gas entry is at the bottom of the tower; in other modifications countercurrent gas/liquid spray flow is used rather than cocurrent. Again in other modifications the tower is oriented with its longitudinal axis horizontal rather than vertical.

We have found embodiments of the invention to be beneficial in connection with wet-type gas scrubbing with water or chemicals; evaporative cooling towers; conditioning gas with water prior to electroprecipitation. In the case of evaporative cooling towers where the gas to be cooled enters a tower at the bottom thereof, the atomizers may be placed adjacent to, but not at, the bottom in a region where good gas flow distribution through the tower has been established. Alternatively the atomizers may be placed within the inlet duct to the tower or at the lower part of the widest portion of the tower proper. The atomizers may also be used in other evaporative cooling towers, for example towers in which the gas flow is from top to bottom, in which case the atomizers may be arranged towards the top of the tower. The towers may employ cocurrent or countercurrent flow of the gas and liquid spray.

Figure 9:
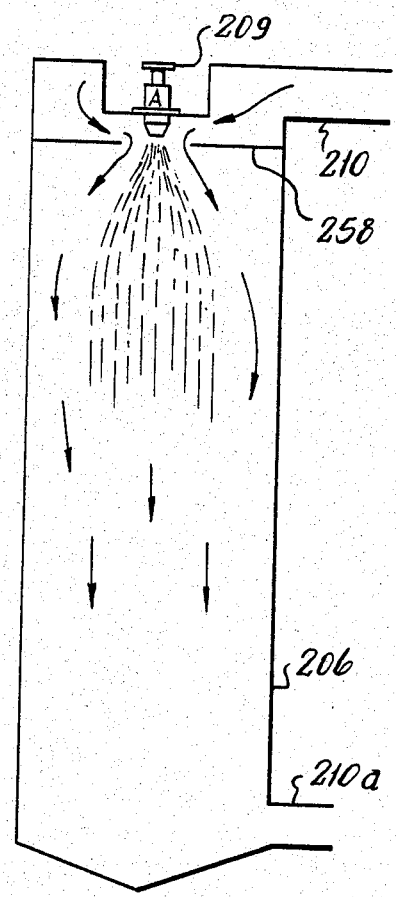
FIG. 9 shows schematically an evaporative cooling tower.

An evaporative cooling tower 206 with top entry and cocurrent flow is shown in FIG. 9. Gas to be cooled enters at 210 and leaves at 210a. Water is sprayed into the tower by an atomizer 209 (as in FIG. 3) and is completely evaporated into the gas to cool it. The arrangement of parts at the top of the tower 206 including an orifice plate 258 and deflector vanes (not shown) is the same as at the top of the tower 106, and the description with reference to FIGS. 7 and 8 applies appropriately to the tower 206 as to the tower 106 with corresponding amendment of the reference numerals, as do other appropriate parts of the descriptive matter given hereinabove. The evaporative cooling tower may be provided with a refractory lining (not shown) according to the temperatures likely to be encountered in use.

The gas temperature at 210 is for example 300° C. to 1,000° C. and the gas temperature at 210a is for example 100° C. to 300° C.

Where the evaporative cooling tower is used for gas conditioning prior to electro-precipitation, the dust in the gas is conditioned by the injection of water droplets which evaporate and cool the gas, decreasing the exhaust gas volume and increasing the humidity of the gas. The cooling affords the advantage that the end temperature and the humidity of the gas can be selected, so that the dust resistivity can be kept to acceptable values. Some dust will fall out at the bottom of the tower, whereas the remainder will be removed by the following electroprecipitator.

In the case of gas scrubbing the atomizer may merely be arranged in a conduit through which the gas passes, as in conventional gas scrubbers, e.g. a venturi conduit.

Whereas the embodiments of the invention have been described with reference to the use of air as the atomizing gaseous medium, it is alternatively possible to use steam or a portion, at least, of the gas to be contacted by the liquid film, for example dirty flue gas itself. In the case of a hot flue gas desulphurizer plant it may be beneficial to use the flue gas as the atomizing gaseous medium, since it avoids the necessity to add a diluent gas with the associated additional gas cleaning capacity following the desulphurizer tower. The expression "air-assisted" atomizer is thus to be understood as one whose operation is assisted by air, steam or the gas to be contacted itself.

We claim:

1. In a method of treating a gaseous-pollutant-containing gas with an abrasive aqueous liquid which absorbs the pollutant to clean the gas while evaporating the liquid: the improvement comprising the steps of
    (a) continuously flowing a film of the liquid onto a rotating extended cup-like surface of a spray device in a direction toward a distal end portion of said cup-like surface preparatory to directing the liquid from the surface into the gas; and
    (b) impacting the liquid in its direction of flow near and beyond the distal end portion of said cup-like surface with a pressurized gaseous stream thereby to produce a spray of liquid droplets for contacting with the polluted gas.

2. In a method of treating a gaseous-pollutant-containing gas with an abrasive aqueous liquid which absorbs the pollutant, wherein the liquid is directed into the polluted gas from an extended surface of a spray device to clean the gas while evaporating the liquid: the improvement wherein the extended surface is provided on the interior of a rotating cup and comprising the steps of
    (a) continuously flowing a film of the liquid on said surface in a direction toward a distal end portion of the surface preparatory to directing the liquid from the surface into the gas;
    (b) providing a gaseous stream around the distal end of said cup where the liquid leaves said surface; and
    (c) impacting the liquid in its direction of flow near and beyond the distal end of said cup with the gaseous stream thereby to produce a spray of liquid droplets for contacting with the polluted gas.

3. The method according to claim 1 or claim 2, wherein said gaseous stream is supplied through an annular orifice surrounding said rotating surface adjacent to said distal end portion where the liquid leaves said surface.

4. The method according to claim 1 or claim 2, wherein said surface is rotated at a speed of up to about 5,000 revolutions per minute.

5. The method according to any one of claims 1, or 2 wherein the liquid is directed into the polluted gas with a low angle of spray.

6. The method according to any one of claims 1, or 2 wherein the spray is generally conical as it leaves the surface and the angle of spray there is from about 25° to about 90°.

7. The method according to any one of claims 1, or 2 wherein the polluted gas is contacted with the liquid in an upright tall thin tower, and the spray device directs the liquid downwardly into the gas in the tower.

8. The method according to claim 7, wherein the tower is circular in cross-section and has an internal height at least twice its internal diameter.

9. The method according to any one of claims 1, or 2 for desulphurizing a hot sulphur dioxide containing gas, wherein the liquid is an aqueous solution or slurry which absorbs sulphur dioxide with chemical reaction, and the reaction product is dried as it is formed.

10. The method according to claim 9 wherein following the contacting of the polluted gas with the liquid the gas is passed through removing means for removing suspended particles therefrom and said removing means comprises an electroprecipitator.

11. The method according to claim 9 wherein the absorbent is selected from the group consisting of sodium carbonate and calcium hydroxide.

12. The method according to claim 9, wherein following the contacting of the polluted gas with the liquid the gas is passed through removing means for removing suspended particles therefrom and said removing means comprises a bag filter.

13. The method according to claim 9, wherein the absorbent contains particulate impurities.

* * * * *